United States Patent [19]

Chattha et al.

[11] 4,394,486

[45] Jul. 19, 1983

[54] HIGH SOLIDS COATINGS WITH ENHANCED FLEXIBILITY AND IMPACT STRENGTH

[75] Inventors: Mohinder S. Chattha, Livonia; Ares N. Theodore, Farmington Hills, both of Mich.

[73] Assignee: Ford Motor Company, Dearborn, Mich.

[21] Appl. No.: 334,684

[22] Filed: Dec. 28, 1981

[51] Int. Cl.³ .................... C08L 61/28; C08L 37/00
[52] U.S. Cl. .................... 525/162; 428/458; 428/460; 524/512; 525/155; 525/328.8; 525/385; 525/386
[58] Field of Search ............ 525/162, 386, 385, 328.8, 525/155; 524/512

[56] References Cited

U.S. PATENT DOCUMENTS

| | | | |
|---|---|---|---|
| 3,622,651 | 11/1971 | Vasta | 260/856 |
| 3,657,384 | 4/1972 | Yoshida et al. | 260/856 |
| 4,085,260 | 4/1978 | Labana et al. | 525/386 |
| 4,195,004 | 3/1980 | Van Acker et al. | 525/386 |

*Primary Examiner*—Theodore E. Pertilla
*Attorney, Agent, or Firm*—Lorraine S. Melotik; Roger L. May

[57] ABSTRACT

A thermosetting coating composition with enhanced flexibility and impact strength and excellent weatherability adapted for use as an automotive topcoat which upon curing forms a hard, glossy, durable coating. The coating composition comprises:

(A) a modified hydroxy acrylic copolymer which is the stepwise reaction product of:
  (i) a copolymer bearing pendant hydroxyl groups and having a number average molecular ($M_n$) of between about 1000-5000,
  (ii) a dicarboxylic acid anhydride comprising at least about 50 percent by weight of an alkyl hexahydrophthalic anhydride, and
  (iii) a monoepoxide functional monomer comprising at least about 90 percent by weight of a $C_2$-$C_{10}$ monoepoxide functional monomer;
(B) an amine-aldehyde crosslinking agent;
(C) optionally a hydroxy functional additive; and
(D) solvent.

The anhydride is reacted in an amount sufficient to esterify at least about 30 percent of the pendant hydroxyl groups of copolymer (i) thereby generating carboxyl functionality, substantially all of which is thereafter reacted with the monoepoxide functional monomer. The amine-aldehyde crosslinking agent is included in the composition in an amount sufficient to provide at least about 0.60 equivalent of nitrogen crosslinking functionality per equivalent of hydroxy functionality included in the composition either as a hydroxyl group of the modified hydroxy acrylic copolymer or as a hydroxyl group of the optional hydroxy-functional additive.

40 Claims, No Drawings

HIGH SOLIDS COATINGS WITH ENHANCED FLEXIBILITY AND IMPACT STRENGTH

Reference is made to commonly assigned and concurrently filed U.S. application Ser. No. 334,683 entitled "High Solids Urethane Coatings with Enhanced Flexibility and Impact Strength" to Theodore et al.

This invention relates to high solids, thermosetting coating compositions. More particularly, this invention relates to a polymeric, high solids coating composition exhibiting enhanced flexibility and impact strength, excellent weatherability and adapted to provide an automative topcoat which demonstrates hardness, high gloss and excellent resistance to solvents and water. Still more particularly, the coating composition of this invention comprises a low molecular weight modified hydroxy acrylic copolymer crosslinkable with amine-aldehyde resins. The modified copolymer comprises a copolymer of two or more ethylenically unsaturated monomers, at least one of which contains a hydroxyl group, modified to lengthen the hydroxy pendant groups by reacting at least some of the pendant hydroxyl groups of the copolymer with an alkyl hexahydrophthatic anhydride to generate an acid-ester group, whereafter the acid functionality of the pendant group is reacted with an epoxy functional monomer, generating hydroxyl groups.

BACKGROUND OF THE INVENTION

Because of increasingly strict solvent emission regulations in recent years, low solvent emission paints have become very desirable. A number of high solids paint compositions have been proposed to meet these low solvent emission requirements. However, many of the compositions are deficient because of difficulty in application, slow curing rates, lack of flexibility, poor durability and low solvent and water resistance.

The low viscosity high solids coating compositions of the invention combine the above discussed desired properties and low application viscosity so as to overcome deficiencies of previously proposed high solids materials. In particular, the composition of the subject invention comprises modified acrylic polymers, which when crosslinked with amine aldehyde resins, provide coatings with outstanding weatherability and having impact strength and flexibility superior to that of the unmodified parent polymer composition, thus making them particularly adapted for automotive topcoats.

DESCRIPTION OF THE RELEVANT ART

Vasta in U.S. Pat. No. 3,622,651 teaches a polymer useful in thermosetting coating compositions which comprises ester groups polymerized into an ethylenically unsaturated polymer backbone. The ester groups are selected from a first ester group, which is formed by polymerizing a hydroxyl alkyl substituted vinyl addition monomer with the backbone monomers, and a second ester group which is formed by subsequently polymerizing into the polymer backbone the reaction product of a hydroxy alkyl monomer, a dicarboxylic acid anhydride and a glycidyl ester. Thus because of these successive polymerization reactions, the composition of Vasta comprises diverse macromolecules. In contrast, the subject composition comprises modified polymers having relatively low molecular weight, wherein the initial hydroxyl pendant group present on the copolymer backbone has been lengthened.

BRIEF DESCRIPTION OF THE INVENTION

The thermosetting coating composition of this invention preferably contains greater than about 60% by weight, more preferably greater than 70% by weight, of nonvolatile solids, and exhibits enhanced flexibility and impact strength and has excellent weatherability. The composition comprises:

(A) a modified hydroxy acrylic copolymer which is the stepwise reaction product of:
  (i) a copolymer bearing pendant hydroxyl groups and having a number average molecular weight ($M_n$) of between about 1000–5000, the copolymer being prepared from between about 5 and about 40 weight percent of a monoethylenically unsaturated hydroxyl alkyl ester having the formula $CH_2=CR_1—COOR_2$ wherein $R_1$ is H or an alkyl group and $R_2$ is a hydroxy alkyl group and (b) between about 95–60 weight percent of other monoethylenically unsaturated monomers;
  (ii) dicarboxylic acid anhydride comprising at least about 50 percent by weight of an alkyl hexahydrophthalic anhydride, wherein (i) and (ii) are reacted in an amount sufficient to esterify between about 30 and about 100 percent of the hydroxyl groups of the copolymer, thereby generating pendant carboxyl groups; and
  (iii) a monoepoxide functional monomer comprising at least about 90 percent by weight $C_2$–$C_{10}$ monoepoxide functional monomers, wherein the monomer is reacted with the pendant carboxyl groups of the polymer reaction product of (i) and (ii) in an amount so as to provide at least about 1.0 equivalent of epoxide groups per equivalent of the pendant carboxyl groups to generate pendant hydroxyl groups;

(B) an amine-aldehyde crosslinking agent;

(C) 0–50 weight percent based on the total weight of (A), (B), (C) and (D) of a hydroxy functional additive having a number average molecular weight ($\overline{M}_n$) of between about 150 and about 6000, preferably between about 500–2500; and (D) solvent.

The amine-aldehyde crosslinking agent is included in the composition in an amount sufficient to provide at least about 0.60, preferably between about 0.75 and 3.75, equivalents of nitrogen crosslinking functionality for each equivalent of hydroxyl functionality included in the composition either as a hydroxyl group on the modified hydroxy acrylic copolymer or as a hydroxyl group on the hydroxy functional additive. In addition, the coating composition of this invention may include additives such as catalysts, antioxidants, U.V. absorbers, flow control or wetting agents, antistatic agents, pigments, plasticizers, etc. The compositions of this invention are also compatible with non-aqueous dispersions (NAD's), which are generally used as flow control additives.

The invention is also directed to the modified hydroxy acrylic copolymer taught above.

DETAILED DESCRIPTION OF THE INVENTION

The coating compositions of this invention provide a system which is particularly suitable for those applications requiring a coating having high gloss, hardness, adhesion and high solvent and water resistance as well as superior impact strength. The desirable characteristics of the coating composition of this invention, in particular the enhanced flexibility and impact strength as well as weatherability are believed to result respectively from (1) the lengthening of the hydroxy pendant groups and (2) the steric hinderance to hydrolysis afforded the ester groups of the modified copolymer by the alkyl group of the anhydride. However, while this theory has been advanced to explain the enhanced flexibility and excellent durability of this coating composition, neither its validity nor its understanding is necessary for the practice of the invention.

Each of the components of the coating composition, the amounts of each of the components required to achieve the desired results of the invention and a method for applying the composition are described hereinafter in greater detail.

Modified Hydroxy Acrylic Polymer

A principal material in the coating composition of this invention is a modified hydroxy acrylic copolymer, wherein a copolymer bearing pendant hydroxyl groups, which may be prepared by conventional free radical induced polymerization of suitable unsaturated monomers, is modified by successive reactions which lengthen the pendant hydroxyl group. The term "copolymer" is used herein refers to the unmodified copolymer, i.e., a copolymer of two or more different monomers at least one of which contains pendant hydroxy groups, which becomes a "modified copolymer" when the pendant hydroxy functional groups have been lengthened.

The copolymers used in the coating composition of this invention have a number average molecular weight ($\overline{M}_n$) of between about 1000–5000, preferably between about 1500–3500 and a glass transition temperature (Tg) of between about 0° C. and 50° C., preferably between about 5° C. and 40° C. The monomers used to prepare the copolymer include between about 5 and about 40 weight percent of one or more monoethylenically unsaturated monomers bearing hydroxyl functionality.

The monoethylenically unsaturated hydroxy functional monomers useful in preparation of the copolymer and providing the hydroxy functionality to the copolymer may be selected from a long list of hydroxy functional monomers. Preferably, however, the hydroxy functional monomers are acrylates and may be selected from the group consisting of, but not limited to the following esters of acrylic or methacrylic acids and aliphatic alcohols: 2-hydroxyethyl acrylate; 3-chloro-2-hydroxypropyl acrylate; 2-hydroxy-1-methylethyl acrylate; 2-hydroxypropyl acrylate; 3-hydroxypropyl acrylate; 2,3 dihydroxypropyl acrylate; 2-hydroxybutyl acrylate; 4-hydroxybutyl acrylate; diethylene glycol acrylate; 5-hydroxypentyl acrylate; 6-hydroxyhexyl acrylate; triethyleneglycol acrylate; 7 hydroxyheptyl acrylate; 2 hydroxymethyl methacrylate; 3-chloro-2-hydroxypropyl methacrylate; 2-hydroxy-1-methylethyl methacrylate; 2-hydroxypropyl methacrylate; 3-hydroxypropyl methacrylate; 2,3-dihydroxypropyl methacrylate; 2-hydroxybutyl methacrylate; 4-hydroxybutyl methacrylate; 3,4-dihydroxybutyl methacrylate; 5-hydroxypentyl methacrylate; 6-hydroxyhexyl methacrylate; 1,3-dimethyl-3-hydroxybutyl methacrylate; 5,6 dihydroxyhexyl methacrylate; and 7-hydroxyheptyl methacrylate.

Although one of ordinary skill in the art will recognize that many different hydroxyl bearing monomers, including those listed, above could be employed, the preferred hydroxy functional monomers for use in the copolymer of the invention are $C_5$–$C_7$ hydroxy alkyl acrylates and/or $C_6$–$C_8$ hydroxy alkyl methacrylates, i.e., esters of $C_2$–$C_4$ dihydric alcohols and acrylic or methacrylic acids.

The remainder of the monomers forming the copolymer, i.e., between about 95 and about 60 weight percent of the monomers of the copolymer, are other monoethylenically unsaturated monomers. These monoethylenically unsaturated monomers are preferably alpha-beta olefinically unsaturated monomers, i.e., monomers bearing olefinic unsaturation between the two carbon atoms in the alpha and beta positions with respect to the terminus of an aliphatic carbon-to-carbon chain.

Among the alpha-beta olefinically unsaturated monomers which may be employed are acrylates (meaning ester of either acrylic or methacrylic acids) as well as mixtures of acrylates and vinyl hydrocarbons. Preferably, in excess of 50 weight percent of the total of the copolymer monomers are esters of $C_1$–$C_{12}$ monohydric alcohols and acrylic or methacrylic acids, i.e., methyl methacrylate, ethylacrylate, butylacrylate, butylmethacrylate, hexylacrylate, 2-ethylhexyl acrylate, laurylmethacrylate, etc. Among the monovinyl hydrocarbons suitable for use in forming the copolymers are those containing 8 to 12 carbon atoms and including styrene, alpha methylstyrene, vinyl toluene, t-butylstyrene and chlorostyrene. When such monovinyl hydrocarbons are employed, they should constitute less than 50 weight percent of the copolymer. Other monomers such as vinyl chloride, acrylonitrile, methacrylonitrile, and vinyl acetate may be included in the copolymer as modifying monomers. However, when employed, these modifying monomers should constitute only between about 0 and about 30 weight percent of the monomers in the copolymer. Small amounts of ethylenically unsaturated carboxylic acids can also be used in preparing the copolymer, such as acrylic acid, methacrylic acid, crotonic acid, itaconic acid, maleic acid and the like.

A preferred embodiment of this invention comprises a copolymer of hydroxyethyl acrylate, acrylic acid and butyl methacrylate.

In preparing the copolymer, the hydroxy functional monomers and the remaining monoethylenically unsaturated monomers are mixed and reacted by conventional free radical initiated polymerization in such proportions as to obtain the copolymer desired. A large number of free radical initiators are known to the art and are suitable for the purpose. These include: benzoyl peroxide; lauryl peroxide; 1-butylhydroxy peroxide; acetylcyclohexylsulfonyl peroxide; diisobutyryl peroxide; di(2-ethylhexyl) peroxydicarbonate; diisopropylperoxydicarbonate; t-butylperoxypivalate; decanoyl peroxide; azobis-(2-methylpropionitrile), etc. The polymerization is preferably carried out in solution using a solvent in which the hydroxy functional copolymer is soluble. Included among the suitable solvents are toluene, xylene, dioxane, butanone, etc. If the hydroxy functional copolymer is prepared in solution, the solid copolymer can be precipitated by pouring the solution at a slow rate into a nonsolvent for the copolymer such as hexane, octane, or water under suitable agitation conditions.

The copolymer useful in the compositions of this invention can also be prepared by emulsion polymerization, suspension polymerization, bulk polymerization, or combinations thereof, or still other suitable methods. In these methods of preparing copolymers, chain transfer agents may be required to control molecular weight of the copolymer to a desired range. When chain transfer agents are used, care must be taken so they do not decrease the shelf stability of the composition by causing premature chemical reactions.

The copolymer containing pendant hydroxyl functionality is then modified to lengthen the hydroxy containing side chain, i.e., the distance between the copolymer backbone chain and the hydroxyl group on the side chain. This is done by first reacting the hydroxyl groups with a dicarboxylic acid anhydride under conditions which will generate pendant ester-carboxyl groups. The anhydride used in this reaction step comprises at least 50 percent by weight, and up to 100 percent by weight, of an alkyl hexahydrophthalic anhydride, wherein the alkyl group preferably comprises up to about 7 carbons, more preferably up to 4 carbons. Most preferably the anhydride comprises methyl hexahydrophthalic anhydride. The remainder of the anhydrides, i.e., 0 to about 50 weight percent, more preferably 0 to about 20 weight percent, and most preferably 0 to about 10 percent by weight, are selected from a variety of anhydrides, which include but are not limited to, hexahydrophthalic, 2-dodecene-1-ylsuccinic, tetrahydrophthalic, methyl tetrahydrophthalic anhydride and camphoric anhydride, and mixtures of suitable anhydrides.

The anhydride is reacted with the copolymer in an amount sufficient to esterify between about 30 and about 100 percent, more preferably between about 40 and about 100 percent, and most preferably between about 50 and about 100 percent of the pendant hydroxyl groups of the copolymer. Generally, a slight excess of anhydride is used over that actually required to esterify the desired percent of hydroxyl groups of the copolymer. To esterify 100 percent of the hydroxyl groups of the polymer, the anhydride and the hydroxyl groups of the copolymer would be reacted in about a 1.2–1.0:1, more preferably a 1.1:1 ratio of equivalents of anhydride to equivalents of hydroxyl groups on the copolymer. By means of this reaction, at least some of the pendant hydroxyl groups of the copolymer are esterified, and pendant carboxyl groups suitable for further reaction are generated on the side chain.

This carboxyl group is subsequently reacted with a monoepoxide functional monomer generally in the presence of a catalyst, whereby the carboxyl group opens the epoxide ring of the monomer in an esterification reaction which generates hydroxyl groups. Thus the side chain has been further lengthened and includes hydroxyl groups available for crosslinking with the amine-aldehyde crosslinking agent during curing. The monomer is reacted with the carboxyl groups in an amount sufficient to provide at least about 1.0 equivalents of epoxide functionality for each equivalent of carboxyl functionality, i.e., essentially all of the pendant carboxyl groups resulting from the copolymer-anhydride reaction will be reacted with an epoxide to generate the hydroxy functionality. For this purpose, an excess of the monomer may be employed and any excess subsequently removed. The above reaction is carried out at suitable conditions apparent to one skilled in the art. Suitable catalyst for this epoxy/carboxy reaction are well known in the art.

Preferred catalysts useful for this reaction are the tetralkyl ammonium salts such as tetra methyl ammonium chloride, tetraethyl ammonium bromide and trimethyl benzyl ammonium chloride as well as metal salts of a carboxylic acid, such as potassium octoate or chromium III octoate. Other useful catalysts include: metal halides such as chromium trichloride, ferric trichloride, and aluminum trichloride; mercaptans and thioethers such as octyl mercaptan, dimercapto propanol and dimercapto-diethyl ether; tertiary amines such as triethyl amine, pyridine, dimethylaniline, quinoline, B-picoline, ethylpyridine, and the like. Still other catalysts known to catalyze carboxy/epoxy reactions will be apparent to those skilled in this art.

The monoepoxide functional monomer comprises at least about 90 percent and up to 100 percent by weight $C_2$–$C_{10}$, preferably $C_3$–$C_7$ monoepoxide functional monomers, which may be substituted by non-interfering functionality such as hydroxyl and includes, but is not limited to, such monomers as ethylene oxide, propylene oxide, epichlorohydrin, 1,2-epoxybutane, 3,4-epoxy-1-butene, 1,2-epoxyethyl benzene, 1,2-epoxy-3-phenoxy propane, 1,2-epoxy-3-fluoropropane, glycidol and mixtures of the above. Preferably this monomer has terminal epoxide functionality. Propylene oxide is particularly preferred. The remaining monomers, i.e., 0 to about 10 percent by weight of the monomers comprise longer chain epoxy monomers such as epoxidized fatty esters, glycidyl ethers, e.g., 2,3-epoxy propyl octyl ether, glycidyl n-hexadecyl ether, glycidyl butyl ether and other monomers, e.g., 1,2-epoxy-3,3,3-trichloropropane, 1,2-epoxytetradecane, 1,2,epoxy cyclodecane, exo-2,3-epoxy norbornane, 1,4-epoxy cyclohexane, 1,2-epoxy-3-fluoropropane and suitable mixtures of the above.

Various mixtures of these types of modified copolymers may also be employed within the scope of the compositions of the invention described herein.

Although the above reactions may be carried out with or without solvents, it is generally suitable and preferable in order to achieve the preferred high solids content of the coating compositions of the invention to use a limited amount or no solvent. However, when desirable, suitable solvents which may be employed include those commonly used, such as toluene, xylene, methyl amyl ketone, butyl acetate, etc. It is necessary however to incorporate solvent into the coating composition in order to facilitate application of the coating composition. Typical solvents used in the coating compositions to facilitate, for example spray application at the preferred high solids content, include toluene, xylene, methyl amyl ketone, acetone, 2-ethoxy-1-ethanol, 2-butoxyl-1-ethanol, diacetone alcohol, butyl acetate, tetrahydrofuran, ethylacetate, dimethylsuccinate, dimethylglutarate, dimethyladipate or mixtures thereof. The solvent in which the modified hydroxy copolymer of the coating composition is prepared, may be employed as the solvent for the coating composition thus eliminating the need for drying modified copolymer after preparation, if such is desired. As mentioned above, the nonvolatile solids content of the coating composition is preferably at least 60% and more preferably 70% or more, thus limiting the amount of solvent included in the composition. However, while the modified copolymer is particularly suitable for use in a high solids composition, the modified copolymer is also suitable for use in low solids compositions. Determination of optimal solids content for a given application would be within the skill of one in the art.

Amino Crosslinking Agent

A second essential component of the paint compositions of this invention is an amine-aldehyde crosslinking agent. Amine-aldehyde crosslinking agents suitable for crosslinking hydroxy functional bearing materials are well known in the art. Typically, these crosslinking materials are products of reactions of melamine, or urea with formaldehyde and various alcohols containing up to and including 4 carbon atoms. Preferably, the amine-aldehyde crosslinking agents useful in this invention are amine-aldehyde resins such as condensation produces of formaldehyde with melamine, substituted melamine, urea, benzoguanamine or substituted benzoguanamine. Preferred members of this class are methylated melamine-formaladehyde resins such as hexamethoxylmelamine. These liquid crosslinking agents have substantially 100 percent nonvolatile content as measured by the foil method at 45° C. for 45 minutes. For the purpose of the preferred high solids coatings of the invention it should be recognized that it is important not to introduce extraneous diluents that would lower the final solids content of the coating. Other suitable amine-aldehyde crosslinking agents would be apparent to one skilled in the art.

Particularly preferred crosslinking agents are the amino crosslinking agents sold by American Cyanamid under the trademark "Cymel". In particular, Cymel 301, Cymel 303, Cymel 325 and Cymel 1156, which are alkylated melamine-formaldehyde resins, are useful in the compositions of this invention.

The crosslinking reactions are generally catalytically accelerated by acids. One such catalyst, for example, which may be so employed is p-toluene sulfonic acid generally added to the composition in about 0.5% by weight based on the total weight of polymer and crosslinking agent. Other useful catalysts are well known to one skilled in the art.

The amine-aldehyde materials function as a crosslinking agent in the composition of the invention by reacting with the hydroxy functionality of the modified copolymer and by reaction with hydroxy functionality on the hydroxy functional additive if such material is included in the composition.

In order to achieve the outstanding properties which make these coating compositions particularly useful as automotive topcoat materials, it is essential that the amount of amino crosslinking agent be sufficient to substantially completely crosslink the hydroxy functionality in the coating composition. Therefore, the amino crosslinking agent should be included in the composition in an amount sufficient to provide at least about 0.60 equivalents, preferably between about 0.75 and about 3.75 equivalents, of nitrogen crosslinking functionality for each equivalent of hydroxy functionality included in the composition either as a hydroxyl group on the optional hydroxy-functional additive or on the modified hydroxy acrylic copolymer.

Optional Hydroxy Functional Additive

Additional hydroxy functionality other than that present on the modified copolymer may be achieved by adding a hydroxy functional additive in amounts up to about 50 weight percent based on the total of the three above discussed components and the hydroxy functional additive itself. Such a material serves to provide additional hydroxy functional additives so as to provide a more intimate crosslinked structure in the final cured product. The hydroxy functional additives useful in the composition are preferably selected from various polyols having a number average molecular weight ($\overline{M}_n$) of between about 150 and about 6000, preferably between about 400 and about 2500. As used herein the term polyol means a compound having two or more hydroxyl groups.

The polyols useful in the invention preferably are selected from the group consisting of: (1) hydroxy functional polyesters; (ii) hydroxy functional polyethers; (iii) hydroxy functional oligoesters, (iv) monomeric polyols; (v) hydroxy functional copolymers produced by free radical polymerization of monoethylenically unsaturated monomers, one of which bears hydroxy functionality and which is included in the copolymer in an amount ranging from about 10 to about 50 weight percent, and (vi) mixtures of (i)-(v).

U.S. Pat. No. 4,181,784 to Chattha et al teaches a high solids paint composition comprising an optional hydroxy functional additive. This patent is hereby expressly incorporated by reference as detailing hydroxy functional additives which are suitable for use as such in the composition of this invention. The following presents a brief description of the optional hydroxy functional additives.

The hydroxy functional polyesters useful in the invention are preferably fully saturated products prepared from aliphatic dibasic acids containing 2-20 carbon atoms, and short chain glycols of up to and including 21 carbon atoms. The molecular weight of these materials ranges from about 200 to about 2500 and the hydroxy number ranges from about 30 to about 230.

Among preferred polyesters are products derived from esterification of ethylene glycol and 1,4 butane diol with adipic acid, ethylene glycol and 1,2 propylene glycol with adipic acid, azelaic acid and sebacic acid copolyester diols and mixtures thereof.

Among useful polyether diols are polytertramethylene ether glycol, polyethyl glycol, polypropylene glycol and the like.

The hydroxy functional oligoesters useful as hydroxy functional additives in the compositions of the invention are oligoesters preferably having a molecular weight of between about 150 and 3000. Such oligoesters may be selected from the group consisting of: (i) oligoesters prepared by reacting a dicarboxylic acid with a monoepoxide such as an alkylene oxide; (ii) oligoesters prepared by reacting a polyepoxide with a monocarboxylic acid; and (iii) oligoesters prepared by reacting a hydroxy functional monocarboxylic acid with either a mono or polyepoxide.

Oligoester (i) is prepared by reacting a dibasic carboxylic acid with a monoepoxide, preferably include those formed by reacting $C_6$-$C_{12}$ dicarboxylic aliphatic acids with ethylene oxide or propylene oxide.

The preparation of oligoesters from carboxylic acids and polyepoxides is well known and is described, for example, in U.S. Pat. Nos. 2,456,408 and 2,653,141. Numerous hydroxy functional oligoesters within this general category will be apparent to those skilled in the art.

The third type of hydroxy functional oligoester, i.e., those prepared by reaction of a hydroxy functional monocarboxylic acid with an epoxide is described in U.S. Pat. No. 3,404,018. While the epoxides employed in accordance with the teachings of that patent are polyepoxides, oligoesters may be prepared in a similar manner to that described therein by employing a monoepoxide, such as an alkylene oxide, and a hydroxy functional monocarboxylic acid as described therein.

Among the numerous monomeric polyols which may be employed as the hydroxy functional additive are the various short chain glycols of up to and including 21 carbon atoms which are useful in preparing the hydroxy functional polyesters discussed above. Other conventional polyhydric alcohols such as glycerols and sugar alcohols are also among the numerous monomeric polyols which will be apparent to those skilled in the art.

The hydroxy bearing copolymer useful as the hydroxy functional additive may be formed monoethylenically unsaturated monomers, with between about 10 to about 50 weight percent bearing hydroxyl functionality.

Although one of ordinary skill in the art will recognize that many different hydroxy bearing monomers could be employed, the preferred hydroxy functional monomers for use in the hydroxy functional resin of the invention are $C_5$–$C_7$ hydroxy alkyl acrylates and/or $C_6$–$C_8$ hydroxy alkyl methacrylates, i.e., esters of $C_2$–$C_4$ dihydric alcohols and acrylic or methacrylic acids.

The remainder of the monomers forming the hydroxy functional copolymer, i.e., between about 90 and about 50 weight percent of the monomers of the copolyer, are other monethylenically unsaturated monomers. These monoethylenically unsaturated monomers are preferably alpha-beta olefinically unsaturated monomers, i.e., monomers bearing olefinic unsaturation between the two carbon atoms in the alpha and beta positions with respect to the terminus of an aliphatic carbon-to-carbon chain.

Other Materials

In addition to the above discussed components, other materials may be included in the coating compositions of the invention. These include materials such as catalysts, antioxidants, U.V. absorbers, surface modifiers and wetting agents, as well as pigments.

Surface modifiers or wetting agents are common additives for liquid paint compositions. The exact mode of operation of these surface modifiers is not known, but it is thought that their presence contributes to better adhesion of the coating composition to the surface being coated and helps formation of thin coatings, particularly on metal surfaces. These surface modifiers are exemplified by acrylic polymers containing 0.1–10 percent by weight of copolymerized monoethylenically unsaturated carboxylic acids such as methacrylic acid, acrylic acid or itaconic acid, cellulose acetate butyrate, silicone oils or mixtures thereof. Of course, the choice of surface modifiers or wetting agent is dependent upon the type of surface to be coated and selection of the same is clearly within the skill of the artisan.

The coating composition of the invention also may include pigments. The amount of pigment in the coating composition may vary, but preferably is between about 3 and about 45 weight percent based on the total weight of the paint composition. If the pigment is metallic flake, the amount ranges from about 1 to about 20 weight percent.

For many applications of the coating compositions of this invention, particularly high solids compositions, it may be desirable to employ flow control additives to provide sag free coatings. Among numerous such materials, NAD's such as described by Porter (S. Porter, Jr. and B. N. McBane, U.S. Pat. No. 4,025,474, May 24, 1977) are compatible with these oligomeric coating compositions. These particle dispersions may be included in an amount up to 15% by weight of the total composition. Other types of NAD's such as described by D. L. Maker and S. C. Peng (U.S. Pat. No. 3,814,721, June 4, 1974) also may be included in the paint composition.

Application Techniques

The coating composition can be applied by conventional methods known to those skilled in the art. These methods include roller coating, spray coating, dipping or brushing and, of course, the particular application technique chosen will depend on the particular substrate to be coated and the environment in which the coating operation is to take place.

A particularly preferred technique for applying the high solids coating compositions, particularly when applying the same to automobiles as topcoats, is spray coating through the nozzle of a spray gun.

High solids paints have in the past caused some difficulty in spray coating techniques because of the high viscosity of the materials and resultant problems in clogging of spray guns. However, because the compositions of this invention demonstrate relatively low viscosity, considering the high solids content, they can be applied by spray coating techniques.

The invention will be further understood by referring to the following detailed examples. It should be understood that the specific examples are presented by way of illustration and not by way of limitation. Unless otherwise specified, all references to "parts" is intended to mean parts by weight.

EXAMPLE 1

Five hundred grams of hydroxy acrylic polymer (70% solids in methyl amyl ketone, ($\overline{M}n = 2000$) containing hydroxy ethyl acrylate (25%), acrylic acid (4%) and butyl methacrylate (71%) is combined with methyl hexahydrophthalic anhydride (182.00 g, 70% solids in methyl amyl ketone) and is charged in a three-neck flask equipped with a gas inlet tube, thermometer, mechanical stirrer and water-cooled condenser. The reaction mixture is stirred and maintained at 80° C. for seven hours under a nitrogen atmosphere. Completion of reaction is indicated by infrared spectra (disappearance of anhydride group). The resulting acid product is reacted with 59.00 grams propylene oxide containing 0.27 grams Cordova Accelerator AMC$^{TM}$-2 (Cordova Chemical Company). The addition of propylene oxide is carried out dropwise over a period of three hours. After refluxing the mixture at 100°–110° C. for seven hours, the excess propylene oxide is removed by vacuum distillation. The modified copolymer with the lengthened, hydroxy containing side chains has a molecular weight of 2850 ($\overline{M}_n = 2850$, 70% solids in methyl amyl ketone).

Ninety grams of above modified acrylic hydroxy polymer (70% solids in methyl amyl ketone) and 20.40 grams Cymel 301 (American Cyanamid) are dissolved in fifteen grams of butyl acetate and 0.9 grams of 10% solution of p-toluene sulfonic acid in ethanol are added to the solution. The coating formulation is sprayed on primed steel panels and baked at 130° C. for 20 minutes to obtain coatings with excellent solvent (xylene and methyl ethyl ketone) resistance. These coatings also exhibit improved impact strength.

EXAMPLE 2

The preparation of a modified hydroxy acrylic polymer is repeated according to Example 1 with the single exception that 120 g. of methyl hexahydrophthalic anhydride (70% solids in methyl amyl ketone) is used for preparing the acid product. A coating formulation containing the above modified polymer is prepared by combining the following ingredients:

| 1. | Modified hydroxy acrylic polymer (70% solids in methyl amyl ketone) | 100.00 g |
|---|---|---|
| 2. | Cymel 301 (American Cyanamid) | 25.00 g |
| 3. | p-toluene sulfonic acid (10% solution in ethanol) | 1.1 g |
| 4. | Butyl acetate | 17.00 g |

The above ingredients are mixed with a paint shaker, sprayed on primed steel panels and baked at 125° C. for 25 minutes. The cured coatings have good physical properties and enhanced flexibility.

EXAMPLE 3

The procedure of Example 1 is repeated with the single exception that 190.00 grams of methyl hexahydrophthalic anhydride (70% solids in methyl amyl ketone) are used in preparation of acid product. A coating formulation including this modified acrylic hydroxy polymer is prepaed by combining the following ingredients:

| 1. | Modified hydroxy acrylic polymer (70% solids in methyl amyl ketone) | 110.00 g |
|---|---|---|
| 2. | Cymel 301 (American Cyanamid) | 24.00 g |
| 3. | p-toluene sulfonic acid (10% solution in ethanol) | 1.20 g |
| 4. | Butyl acetate | 18.00 g. |

The above ingredients are mixed and sprayed on primed steel panels. The panels are cured at 130° C. for 20 minutes to obtain coatings with good physical properties and enhanced flexibility.

EXAMPLE 4

The procedure of Example 1 is repeated with the single exception that the molecular weight of the unmodified hydroxy acrylic polymer is 3800 ($M_n=3800$, 70% solids in methyl amyl ketone). A coating composition including the resulting modified, copolymer is prepared by combining the following ingredients:

| 1. | Modified hydroxy acrylic polymer (70% solids in methyl amyl ketone) | 90.00 g |
|---|---|---|
| 2. | Cymel 301 (American Cyanamid) | 32.00 g |
| 3. | p-toluene sulfonic acid (10% solution in ethanol) | 1.30 g |
| 4. | Butyl acetate | 20.00 g |

The above ingredients are mixed with a paint shaker and sprayed on primed steel panels. The panels are cured at 120° C. for 30 minutes to obtain coatings with excellent solvent (xylene and methyl ethyl ketone) resistance. The coating exhibits enhanced stone-chip resistance.

EXAMPLE 5

Ninety grams of modified hydroxy acrylic polymer from Example 1 are mixed with 13.00 grams of aluminum flakes (65% solids in naphtha) in 18 grams methyl amyl ketone and 36.00 grams butyl acetate. Twenty one grams of Cymel 301, five grams cellosolve acetate and 1.00 gram of p-toluene sulfonic acid (10% solution in ethanol) are added to above mixture. The resulting coating formulation is sprayed on primed steel panels and cured at 130° C. for 20 minutes to obtain silver metallic coatings with excellent solvent (xylene and methyl ethyl ketone) resistance and enhanced flexibility.

EXAMPLE 6

Modified hydroxy acrylic polymer (205.00 g) from Example 1 is dissolved in methyl amyl ketone (350.00 g) and titanium dioxide (1450.00 g) added with agitation to this solution. The resulting mixture is whipped with a cowl's blade at 90 cycles per second for 20 minutes to obtain Hegman grind fineness of 7.5.

Seventy grams of above mill base, one hundred and ten grams of modified hydroxy acrylic polymer from Example 1, twenty five grams Cymel 301 (American Cyanamid), 1.1 grams p-toluene sulfonic acid (10% solution in ethanol) are mixed with 25.00 grams butyl acetate and 20.00 grams methyl amyl ketone. The resulting paint formulation is applied on primed steel panels. The panels are baked at 130° C. for 20 minutes to obtain coatings with excellent solvent (xylene and methyl ethyl ketone) resistance and enhanced stone-chip resistance.

EXAMPLE 7

The procedure of Example 1 is repeated with the exception that to the formulation of Example 1 are added seven grams of caprolactone based hydroxy ester PCP-0300 (Union Carbide) and 3.00 grams Cymel 301 (American Cyanamid). The coating formulation is sprayed on primed steel panels and cured at 125° C. for 30 minutes to obtain a coating with excellent solvent (xylene and methyl ethyl ketone) resistance and improved impact strength.

EXAMPLE 8

The procedure of Example 1 is repeated with the single exception that five grams of Niax Polyol LHT-34 (Union Carbide), two grams Cymel 301 and five grams methyl amyl ketone are added to formulation described in Example 1. The resulting coating formulation is applied on primed steel panels and cured at 130° C. for 20 minutes to obtain coatings with excellent solvent resistance and improved stone-chip resistance.

EXAMPLE 9

Example 1 is repeated with the single exception that 21.00 grams of Cymel 303 are used in place of Cymel 301. The resulting formulation is sprayed on primed steel panels and cured at 130° C. for 20 minutes. The cured films exhibit excellent solvent resistance and improved impact strength.

EXAMPLE 10

The procedure of Example 1 is repeated with the following exceptions: 27.00 grams of Cymel 325 (American Cyanamid) are used in place of Cymel 301 and 2.3 grams of phenyl acid phosphate (40% solution in solvesso 100) in place of p-toluene sulfonic acid. The mixture is sprayed on primed steel panels and cured at 125° C. for 25 minutes. The cured films exhibit excellent solvent (xylene and methyl ethyl ketone) resistance and enhanced flexibility.

EXAMPLE 11

Example 10 is repeated with the single exception that Resimine XC 717 (Monsanto Co.) is used in place of Cymel 325. The cured films (130° C. for 20 minutes) exhibit good physical properties and impact strength.

EXAMPLE 12

The procedure of Example 1 is repeated with the single exception that 3.00 grams of Cymel 301 are replaced by 4.00 grams of benzoguanamine 1123 (American Cyanamid). The coating formulation are sprayed on primed steel panels and cured at 140° C. for 20 minutes. The cured films exhibit good solvent resistance and improved stone-chip resistance.

EXAMPLE 13

Example 1 is repeated with the single exception that 4.00 grams of Cymel 301 are replaced by 3.00 grams of glycoluril 1170 (American Cyanamid). The formulation is applied by spraying on primed steel panels and cured at 135° C. for 25 minutes to obtain coatings with good physical properties and enhanced stone-chip resistance.

EXAMPLE 14

Example 1 is repeated with the exception that 35.00 grams of Cymel 301 are used for crosslinking the modified polymer of Example 1. The resulting formulation is sprayed on primed steel panels and baked at 130° C. for 20 minutes. The coatings show good adhesion and solvent resistance.

EXAMPLE 15

Example 10 is repeated with the exception that 36.00 grams Cymel 325 are used for crosslinking the modified polymer. The coating formulation is sprayed on primed steel panels and at 130° C. for 20 minutes. The coatings have good physical properties.

EXAMPLE 16

The procedure of Example 1 was repeated with the exception that the coating formulation deposited on the primed panels is cured at 150° C. for 7 minutes. Coatings with good properties are obtained.

EXAMPLE 17

Example 1 was repeated with the exception that the coated panels are baked at 100° C. for 30 minutes. Coatings with good solvent resistance are obtained.

EXAMPLE 18

The procedure of Example 1 is repeated with the exception that 10.00 grams of the propylene oxide are substituted by an equal amount of glycidol (Aldrick Chem. Co.), and 36.00 grams of Cymel 325 are used in place of Cymel 301. The cured film (130° C. for 25 minutes) exhibit good adhesion and solvent resistance.

EXAMPLE 19

Example 1 is repeated with the single exception that 6.00 grams of the propylene oxide are replaced with an equal amount of n-butyl glycidyl ether. Coatings with good physical properties are obtained.

EXAMPLE 20

Nine (9) parts of aluminum flakes (65% in naptha) and 15 parts of nonaqueous dispersion (42% solids by weight), prepared as described in Example A of U.S. Pat. No. 4,025,474, are blended with the composition described in Example 2. The resulting formulation is applied to primed steel panels which are baked at 130° C./19 minutes to obtain silver metallic coatings.

In view of this disclosure, many modifications of this invention will be apparent to those skilled in the art. It is intended that all such modifications which fall within the true scope of the invention will be included within the terms of the appended claims.

We claim:

1. A thermosetting coating composition exhibiting improved flexibility and impact strength and having excellent weatherability and comprising:
    (A) a modified hydroxy acrylic copolymer which is the stepwise reaction product of:
        (i) a copolymer bearing pendant hydroxyl groups and having a number average molecular weight ($\overline{M}_n$) of between about 1000–5000, said copolymer being prepared from (a) between about 5 and about 40 weight percent of monoethylenically unsaturated hydroxy alkyl ester of the formula $CH_2=CR_1—COOR_2$ wherein $R_1$ is H or an alkyl group and $R_2$ is a hydroxy alkyl group and (b) between about 95–60 weight percent of other monoethylenically unsaturated monomers;
        (ii) dicarboxylic acid anhydride comprising at least about 50 percent by weight of an alkyl hexahydrophthalic anhydride, wherein (i) and (ii) are reacted in an amount sufficient to esterify between about 30 and about 100 percent of said pendant hydroxyl groups of said copolymer thereby generating pendant carboxyl groups; and
        (iii) a monoepoxide functional monomer comprising at least about 90 percent by weight $C_2$–$C_{10}$ monoepoxide functional monomers, wherein said monomer is reacted with said pendant carboxyl groups of the polymer reaction product of (i) and (ii) in an amount so as to provide at least about 1.0 equivalent of epoxide groups per equivalent of said pendant carboxyl groups to generate pendant hydroxyl groups;
    (B) an amine-aldehyde crosslinking agent;
    (C) 0–50 weight percent based on the total weight of (A), (B) (C) and (D) of a hydroxy functional additive having a number average molecular weight ($M_n$) of between about 150 and about 6000; and
    (D) solvent said amine-aldehyde crosslinking agent being included in said composition in an amount sufficient to provide at least about 0.60 equivalents of nitrogen crosslinking functionality for each equivalent of hydroxyl functionality included in said composition either as a hydroxyl group on said modified hydroxy acrylic copolymer or as a hydroxyl group on said hydroxy functional additive.

2. A coating composition according to claim 1, wherein said monoethylenically unsaturated hydroxy alkyl ester comprises $C_5$–$C_7$ hydroxy alkyl acrylates, $C_6$–$C_8$ hydroxy alkyl methacrylates, or mixtures thereof.

3. A coating composition according to claim 2, wherein said other monoethylenically unsaturated monomers comprise acrylates, other vinyl monomer, or mixtures of said acrylates and other vinyl monomers.

4. A coating composition according to claim 1, wherein said alkyl group of said alkyl hexahydrophthalic anhydride comprises a lower alkyl group having up to about seven carbons.

5. A coating composition according to claim 1, wherein said dicarboxylic acid anhydride comprises at least 80 percent by weight of an alkyl hexahydrophthalic anhydride.

6. A coating composition according to claims 4 or 5, wherein said alkyl hexahydrophthalic anhydride is methyl hexahydrophthalic anhydride.

7. A coating composition according to claim 1, wherein up to 50 percent by weight of said dicarboxylic acid anhydride employed in the preparation of said copolymer comprises an anhydride selected from the group consisting of hexahydrophthalic anhydride, 2-dodecene-1-ylsuccinic anhydride, tetrahydrophthalic anhydride, methyl tetrahydrophthalic anhydride, camphoric anhydride, and mixtures of the above.

8. A coating composition according to claim 1, wherein said $C_2-C_{10}$ monoepoxide functional monomers comprises a monomer selected from the group consisting of ethylene oxide, propylene oxide, epichlorohydrin, glycidol, 1,2-epoxy butane, 1,2 epoxy-1 butene, 1,2-epoxyethyl benzene, 1,2 epoxy-3-phenoxy propane, and mixtures of the above.

9. A coating composition according to claim 8, wherein said $C_2-C_{10}$ monoepoxide functional monomer is a $C_3-C_7$ monomer.

10. A coating composition according to claim 9, wherein said $C_3-C_7$ monomer contains terminal epoxide functionality.

11. A coating composition according to claim 1, wherein said monoepoxide functional monomer other than said $C_2-C_{10}$ monoepoxide monomer comprises a monomer selected from the group consisting of epoxidized fatty esters, 2,3-epoxypropyl octyl ether, 1,2-epoxy-3,3,3-trichloropropane, 1,2-epoxytetradecane, 1,2-epoxycyclodecane, exo-2,3-epoxynorbornane, 1,4-epoxy-cyclohexane, 1,2-epoxy-3-floropropane, and mixtures of the above.

12. A coating composition according to claim 1, wherein said amine-aldehyde crosslinking agent is selected from the group consisting of condensation products of formaldehyde with melamine, substituted melamine, urea, benzoquanamine and substituted benzoguanamine and mixtures of said condensation products and is included in an amount sufficient to provide between about 0.75 and about 3.75 equivalent of nitrogen crosslinking functionality for each equivalent of hydroxy functionality included in said composition, either as a hydroxyl group on said modified hydroxy acrylic copolymer or as a hydroxyl group on said hydroxy functional additive.

13. A coating composition according to claim 1, wherein said hydroxy functional additive is a polyol selected from the group consisting of (i) hydroxy functional polyesters, (ii) hydroxy functional polyethers, (iii) hydroxy functional oligoesters, (iv) monomeric polyols, (v) hydroxy functional copolymers formed from monoethylenically unsaturated monomers, one or more of which bears hydroxy functionality and which is included in said copolymer in amounts ranging from about 10 to about 50 weight percent of said copolymer, and (vi) mixtures of (i)–(v).

14. A coating composition according to claim 1, which further comprises up to 15 weight percent based on the total weight of the composition of a flow control additive.

15. A coating composition according to claim 1, wherein said dicarboxylic acid anhydride consists of methyl hexahydrophthalic anhydride and said monoepoxide functional monomer consists of a $C_2-C_{10}$ monoepoxide functional monomer.

16. A modified hydroxy acrylic copolymer which is the stepwise reaction product of:

(i) a copolymer bearing pendant hydroxyl groups having a number average molecular weight $(\overline{M}_n)$ of between about 1000–5000, said copolymer being prepared from (a) between about 5 and about 40 weight percent of monoethylenically unsaturated hydroxy alkyl ester having formula $CH_2{=}CR_1{-}COOR_2$ wherein $R_1$ is H or an alkyl group and $R_2$ is a hydroxy alkyl group and (b) between about 95–60 weight percent of other monoethylenically unsaturated monomers;

(ii) dicarboxylic acid anhydride comprising at least about 50 percent by weight of an alkyl hexahydrophthalic anhydride, wherein (i) and (ii) are reacted in an amount sufficient to esterify between about 30 and about 100 percent of said pendant hydroxyl groups of said copolymer thereby generating pendant carboxyl groups; and (iii) a monoepoxide functional monomer comprising at least about 90 percent by weight $C_2-C_{10}$ monoepoxide functional monomers, wherein said monomer is reacted with said pendant carboxyl groups of the polymer reaction product of (i) and (ii) in an amount so as to provide at least about 1.0 equivalent of epoxide groups per equivalent of said pendant carboxyl groups to generate pendant hydroxyl groups.

17. A modified hydroxy acrylic copolymer according to claim 16, wherein said monoethylenically unsaturated hydroxy alkyl ester comprises $C_5-C_7$ hydroxy alkyl acrylates, $C_6-C_8$ hydroxy alkyl methacrylates, or mixtures thereof.

18. A modified hydroxy acrylic copolymer according to claim 16, wherein said other monoethylenically unsaturated monomers comprise acrylates, other vinyl monomer, or mixtures of said acrylates and other vinyl monomers.

19. A modified hydroxy acrylic copolymer according to claim 16, wherein said alkyl group of said alkyl hexahydraphthalic anhydride comprises a lower alkyl group having up to about seven carbons.

20. A modified hydroxy acrylic copolymer according to claim 16, wherein said dicarboxylic acid anhydride comprises at least 80 percent by weight of an alkyl hexahydrophthalic anhydride.

21. A modified hydroxy acrylic copolymer according to claims 19 or 20, wherein said alkyl hexahydrophthalic anhydride is methyl hexahydrophthalic anhydride.

22. A modified hydroxy acrylic copolymer according to claim 16, wherein up to about 50 percent by weight of said dicarboxylic acid anhydride employed in the preparation of said copolymer comprises an anhydride selected from the group consisting of hexahydrophthalic anhydride, 2-dodecene-1-ylsuccinic anhydride, tetrahydrophthalic anhydride, methyl tetrahydrophthalic anhydride, camphoric anhydride, and mixtures of the above.

23. A modified hydroxy acrylic copolymer according to claim 16, wherein said $C_2-C_{10}$ monoepoxide functional monomers comprises a monomer selected from the group consisting of ethylene oxide, propylene oxide, epichlorohydrin, glycidol, 1,2-epoxy butane, 1,2 epoxy-1-butene, 1,2-epoxyethyl benzene, 1,2-epoxy-3-phenoxy propane, and mixtures of the above.

24. A modified hydroxy acrylic copolymer according to claim 23, wherein said $C_2-C_{10}$ nonoepoxide functional monomer is a $C_3-C_7$ monomer.

25. A modified hydroxy acrylic copolymer according to claim 24, wherein said $C_3-C_7$ monomer contains terminal epoxide functionality.

26. A modified hydroxy acrylic copolymer according to claim 16, wherein said monoepoxide functional monomer other than said $C_2-C_{10}$ monoepoxide monomer comprises a monomer selected from the group consisting of epoxidized fatty esters, 2,3-epoxypropyloctyl ether, 1,2-epoxy-3,3,3-trichloropropane, 1,2-epoxytetradecane, 1,2-epoxycyclodecane, exo-2,3-epoxynorbornane, 1,4-epoxycyclohexane, 1,2-epoxy-3-fluoropropane and mixtures of the above.

27. A high solids thermosetting coating composition which contains greater than about 60 percent by weight of nonvolatile solids and which except for pigments and other nonreactive components, consists essentially of:
(A) a modified hydroxy acrylic copolymer which is the stepwise reaction product of:
  (i) a copolymer bearing pendant hydroxyl groups and having a number average molecular weight ($M_n$) of between about 1000–5000, said copolymer being prepared from (a) between about 5 and about 40 weight percent of monoethylenically unsaturated hydroxy alkyl ester having the formula $CH_2=CR_1-COOR_2$ wherein $R_1$ is H or an alkyl group and $R_2$ is a hydroxy alkyl group and (b) between about 95–60 weight percent of other monoethylenically unsaturated monomers;
  (ii) dicarboxylic acid anhydride comprising at least about 50 percent by weight of an alkyl hexahydrophthalic anhydride, wherein (i) and (ii) are reacted in an amount sufficient to esterify between about 30 and about 100 percent of said pendant hydroxyl groups of said copolymer thereby generating pendant carboxyl groups; and
  (iii) a monoepoxide functional monomer comprising at least about 90 percent by weight $C_2-C_{10}$ monoepoxide functional monomers, wherein said monomer is reacted with said pendant carboxyl groups of the polymer reaction product of (i) and (ii) in an amount so as to provide at least about 1.0 equivalent of epoxide groups per equivalent of said pendant carboxyl groups to generate pendant hydroxyl groups;
(B) an amine-aldehyde crosslinking agent;
(C) 0–50 weight percent based on the total weight of (A), (B), (C), (D) and (E) of a hydroxy functional additive having a number average molecular weight ($M_n$) of between about 150 and about 6000,
(D) solvent; and
(E) up to 15 weight percent based on the total weight of (A), (B), (C), (D) and (E) of a flow control additive, said amine-aldehyde crosslinking agent being included in said composition in an amount sufficient to provide at least about 0.60 equivalents of nitrogen cross-linking functionality for each equivalent of hydroxyl functionality included in said composition either as a hydroxyl group on said modified hydroxy acrylic copolymer or as a hydroxyl group on said hydroxy functional additive.

28. A high solids coating composition according to claim 27, wherein said other monoethylenically unsaturated hydroxy alkyl ester is selected from the group consisting of $C_5-C_7$ hydroxy alkyl acrylates, $C_6-C_8$ hydroxy alkyl methacrylates, and mixtures thereof.

29. A high solids coating composition according to claim 28, wherein said other monoethylenically unsaturated monomers are selected from the group consisting of acrylates, other vinyl monomer, and mixtures of said acrylates and other vinyl monomers.

30. A high solids coating composition according to claim 27, wherein said alkyl group of said alkyl hexahydrophthalic anhydride comprises a lower alkyl group having up to about seven carbons.

31. A high solids coating composition according to claim 27, wherein said dicarboxylic acid anhydride comprises at least 80 percent by weight of an alkyl hexahydrophthalic anhydride.

32. A high solids coating composition according to claims 30 or 31, wherein said alkyl hexahydrophathalic anhydride is methyl hexahydrophthalic anhydride.

33. A high solids coating composition according to claim 27, wherein up to 50 percent by weight of said dicarboxylic acid anhydride employed in the preparation of said copolymer is selected from the group consisting of hexahydrophthalic anhydride, 2-dodecene-1-ylsuccinic anhydride, tetrahydrophthalic anhydride, methyl tetrahydrophthalic anhydride, camphoric anhydride, and mixtures of the above.

34. A high solids coating composition according to claim 27, wherein said $C_2-C_{10}$ monoepoxide functional monomers are selected from the group consisting of ethylene oxide, propylene oxide, epichlorohydrin, glycidol, 1-2-epoxy butane, 1,2 epoxy-1 butene, 1,2-epoxyethyl benzene, 1,2 epoxy-3-phenoxy propane, or mixtures of the above.

35. A high solids coating composition according to claim 34, wherein said $C_2-C_{10}$ monoepoxide functional monomer is a $C_3-C_7$ monomer.

36. A high solids coating composition according to claim 35, wherein said $C_3-C_7$ monomer contains terminal epoxide functionality.

37. A high solids coating composition according to claim 27 wherein said monoepoxide functional monomer other than said $C_2-C_{10}$ monoepoxide monomer is selected from the group consisting of epoxidized fatty esters, 2,3-epoxypropyl octyl ether, 1,2-epoxy 3,3,3-trichloropropane, 1,2-epoxytetradecane, 1,2-epoxycyclodecane, exo-2,3-epoxynorbornane, 1,4-epoxycyclohexane, 1,2 epoxy-3-fluoropropane, or mixtures of the above.

38. A high solids coating composition according to claim 27, wherein said amine-aldehyde crosslinking agent is selected from the group consisting of condensation products of formaldehyde with melamine, substituted melamine, urea, benzoquanamine and substituted benzoguanamine and mixtures of said condensation products and is included in an amount sufficient to provide between about 0.75 and about 3.75 equivalent of nitrogen crosslinking functionality for each equivalent of hydroxy functionality included in said composition either as a hydroxyl group on said modified hydroxy acrylic copolymer or as a hydroxyl group on said hydroxy functional additive.

39. A high solids coating composition according to claim 27, wherein said hydroxy functional additive is a polyol selected from the group consisting of (i) hydroxy functional polyesters, (ii) hydroxy functional polyethers, (iii) hydroxy functional oligoesters, (iv) monomeric polyols, (v) hydroxy functional copolymers formed from monoethylenically unsaturated monomers, one or more of which bears hydroxy functionality and which is included in said copolymer in amounts ranging from about 10 to about 50 weight percent of said copolymer, and (vi) mixtures of (i)–(v).

40. A high solids coating composition according to claim 27, wherein said dicarboxylic acid anhydride consists of methyl hexahydrophthalic anhydride and said monoepoxide functional monomer consists of a $C_2-C_{10}$ monoepoxide functional monomer.

* * * * *